(12) United States Patent
Salter et al.

(10) Patent No.: US 9,783,100 B2
(45) Date of Patent: Oct. 10, 2017

(54) RUNNING BOARD ILLUMINATION SYSTEM AND METHOD FOR A MOTOR VEHICLE

(71) Applicant: FORD GLOBAL TECHNOLOGIES, LLC, Dearborn, MI (US)

(72) Inventors: Stuart C. Salter, White Lake, MI (US); Mylene Loudjom Motsebo, Allen Park, MI (US); Terrence Wilson, Southfield, MI (US); Aaron Bradley Johnson, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/985,639

(22) Filed: Dec. 31, 2015

(65) Prior Publication Data

US 2016/0347240 A1  Dec. 1, 2016

Related U.S. Application Data

(60) Provisional application No. 62/167,929, filed on May 29, 2015.

(51) Int. Cl.
*H05B 33/08* (2006.01)
*H05B 37/02* (2006.01)
(Continued)

(52) U.S. Cl.
CPC ............... *B60Q 1/323* (2013.01); *F21V 7/06* (2013.01); *H05B 33/0845* (2013.01);
(Continued)

(58) Field of Classification Search
CPC .. B60Q 1/323; B60Q 1/32; F21V 7/06; H05B 33/0845; H05B 37/0218
(Continued)

(56) References Cited

U.S. PATENT DOCUMENTS

| 4,116,457 A | 9/1978 | Nerem et al. |
| 4,985,810 A * | 1/1991 | Ramsey ................. B60R 3/002 362/267 |

(Continued)

FOREIGN PATENT DOCUMENTS

| CA | 2282819 A1 | 3/2001 |
| CN | 202675159 U | 1/2013 |

(Continued)

OTHER PUBLICATIONS

AMP Research Power Step. Installation giude for Dodge Ram 1500/2500 trucks. www.amp-research.com, IM76138 rev Feb. 24, 2015 B pp. 1-14.*

(Continued)

*Primary Examiner* — Dylan White
(74) *Attorney, Agent, or Firm* — Jason Rogers; King & Schickli, PLLC

(57) ABSTRACT

A running board illumination system is provided for a motor vehicle. That system includes a first illumination element having a first color, a second illumination element having a second, different color and a controller. The controller is configured to receive information respecting at least one motor vehicle status and also adapted to illuminate a running board with the first illumination element or the second illumination element based upon that information.

19 Claims, 6 Drawing Sheets

(51) Int. Cl.
*B60Q 1/32* (2006.01)
*F21V 7/06* (2006.01)
*B60R 3/02* (2006.01)
*B60R 3/00* (2006.01)
*F21Y 113/00* (2016.01)

(52) U.S. Cl.
CPC ..... *H05B 37/0218* (2013.01); *B60Q 2400/40* (2013.01); *B60R 3/002* (2013.01); *B60R 3/02* (2013.01); *F21Y 2113/00* (2013.01)

(58) Field of Classification Search
USPC .................................................... 315/77, 79
See application file for complete search history.

(56) References Cited

U.S. PATENT DOCUMENTS

| | | | | |
|---|---|---|---|---|
| 6,179,454 | B1* | 1/2001 | Hoines | B60Q 1/323 362/495 |
| 6,190,027 | B1 | 2/2001 | Lekson | |
| 6,250,785 | B1* | 6/2001 | Mallia | B60Q 1/323 362/495 |
| 6,659,629 | B2 | 12/2003 | Potter et al. | |
| 6,926,431 | B1* | 8/2005 | Foote | B60Q 1/2665 362/134 |
| 7,017,927 | B2 | 3/2006 | Henderson et al. | |
| 7,621,546 | B2* | 11/2009 | Ross | B60R 3/02 280/163 |
| 8,231,169 | B2* | 7/2012 | Leopold | B62D 25/02 280/164.1 |
| 8,235,568 | B2* | 8/2012 | Heiden | B60Q 1/24 362/249.02 |
| 8,840,143 | B2* | 9/2014 | Higgins | B60R 3/00 280/163 |
| 2008/0037266 | A1* | 2/2008 | Cunnien | B60Q 1/323 362/495 |
| 2012/0081915 | A1* | 4/2012 | Foote | B60R 1/12 362/494 |
| 2013/0335212 | A1* | 12/2013 | Purks | B60Q 1/34 340/435 |
| 2015/0241015 | A1* | 8/2015 | Johnson | G09F 19/18 362/509 |
| 2016/0159274 | A1* | 6/2016 | Salter | B60C 23/0406 315/77 |

FOREIGN PATENT DOCUMENTS

| | | |
|---|---|---|
| DE | 102010007848 A1 | 9/2010 |
| JP | 5198906 B2 | 5/2013 |

OTHER PUBLICATIONS

Kyle Kennedy, Youtube video, Aug. 1, 2013. time 1:00-1:30. Operation of Amp Research Power Step with LED lights https://www.youtube.com/watch?v=8y_xTmlyOEc.*
English Machine Translation of DE102010007848A1.
English Machine Translation of CN202675159U.
English Machine Translation of JP5198906B2.

* cited by examiner

RUNNING BOARD ILLUMINATION SYSTEM AND METHOD FOR A MOTOR VEHICLE

This application claims the benefit of U.S. provisional patent application Ser. No. 62/167,929, filed on 29 May 2015, the full disclosure of which is incorporated herein by reference.

TECHNICAL FIELD

This document relates generally to the motor vehicle equipment field and, more particularly, to a new and improved running board illumination system as well as a related method.

BACKGROUND

The concept of equipping a motor vehicle, such as pickup truck, with deployable running boards beneath the passenger entry doors and bottom side sills is known in the art. Such running boards are maintained in raised, stowed positions while the vehicle is operated at speed and displaced to lowered, deployed positions when: 1) the transmission is in the "park" position, or 2) side doors are opened so that the footpad of the running boards may be utilized to aid individuals to enter and exit the passenger cabin of the motor vehicle.

This document relates to a new and improved running board illumination system and related method providing heretofore unseen functionality and versatility of operation as well as improved opulent, harmonious appearance making it a value-added addition to the motor vehicle.

SUMMARY

In accordance with the purposes and benefits described herein, a running board illumination system is provided for a motor vehicle. That running board illumination system comprises a first illumination element having a first color, a second illumination element having a second, different color and a controller configured to receive information respecting at least one motor vehicle status and adapted to illuminate a running board with the first illumination element or the second illumination element based upon that information.

In one possible embodiment, the information relates to vehicle transmission status. In addition, the information may also relate to vehicle speed. In another possible embodiment, that information relates to running board position. In any of these embodiments, the running board may be illuminated with white light from the first illumination element when the running board is in the lowered, deployed position so as to clearly light only the footpad surface of the running board for use by an individual entering or exiting the motor vehicle cabin. In contrast, when the running board is in the raised, stowed position, the running board is illuminated with amber light from the second illumination element.

The running board illumination system further includes a lamp assembly housing. The first illumination element is oriented on a first longitudinal axis within the lamp assembly housing while the second illumination element is oriented on a second longitudinal axis within the lamp assembly housing. The second axis is offset from the first axis. Further, the second axis may also be tilted with respect to the first axis. The axis of light aim and optical prescriptions are unique for specifically illuminating only the footpad surface of the deployed running board with white light or amber light in stowed position.

The running board illumination system may further include a parabolic reflector adjacent to the first illumination element and an optically prescribed fluted lens carried by the lamp assembly housing sealing the assembly contents from the elements.

In one possible embodiment, the first illumination element is a first plurality of light emitting diodes having a first color while the second illumination element is a second plurality of light emitting diodes having a second color. Further, the running board illumination system includes a single LED driver responsive to the controller for independently driving the first plurality of light emitting diodes and the second plurality of light emitting diodes. In operation, the first illumination element/first set of light emitting diodes emits white light that is directed by the parabolic reflector through the optically prescribed fluted lens onto a footpad surface of the running board when the running board is in the lowered, deployed position. In contrast, the second illumination element/second plurality of light emitting diodes emits amber light that passes through the optically prescribed fluted lens and a gap between the running board and a sidewall sill of the motor vehicle when the running board is in the raised, stowed position.

In accordance with an additional aspect, a method is provided of illuminating a running board on a motor vehicle. That method may be broadly described as comprising the steps of: (a) equipping the motor vehicle with a running board illumination system including a first illumination element having a first color, a second illumination element having a second color and a controller, (b) selectively illuminating the running board with light emitted by the first illumination element when the running board is in a lowered, deployed position and (c) selectively illuminating the running board with light emitted by the second illumination element when the running board is in a raised, stowed position. In one possible embodiment, the method further includes receiving, by the controller, information respecting transmission state and vehicle speed and selectively illuminating the running board with the first illumination element or the second illumination element based upon said information.

In one possible embodiment, the method further includes operating, by the controller, the second illumination element as a redundant turn signal. In one possible embodiment, the method further includes alternating, by the controller, the redundant turn signal with a main turn signal of the motor vehicle. In one possible embodiment, the method includes operating, by the controller, the second illumination element as a sequential turn signal. In one possible embodiment, the method further includes operating, by the controller, the second illumination element as a redundant emergency flasher. In one possible embodiment, the method includes alternating, by the controller, the redundant emergency flasher with a main emergency flasher of the motor vehicle.

In one possible embodiment, the method further includes flashing, by the controller, both of the first illumination element and the second illumination element when the running board is being displaced from the raised, stowed position to the lowered, deployed position. Further, the method may include varying, by the controller, light intensity of the first illumination element and/or the second illumination element based upon ambient light conditions. In yet another embodiment, the method may include varying, by the controller, the light intensity of the first illumination element and/or the second illumination element based upon an alarm button state on a motor vehicle key fob in possession of the operator of the motor vehicle.

In the following description, there are shown and described several preferred embodiments of the running board illumination system and the related method. As it should be realized, the system and method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the running board illumination system and together with the description serve to explain certain principles thereof. In the drawing figures.

Figure 1:
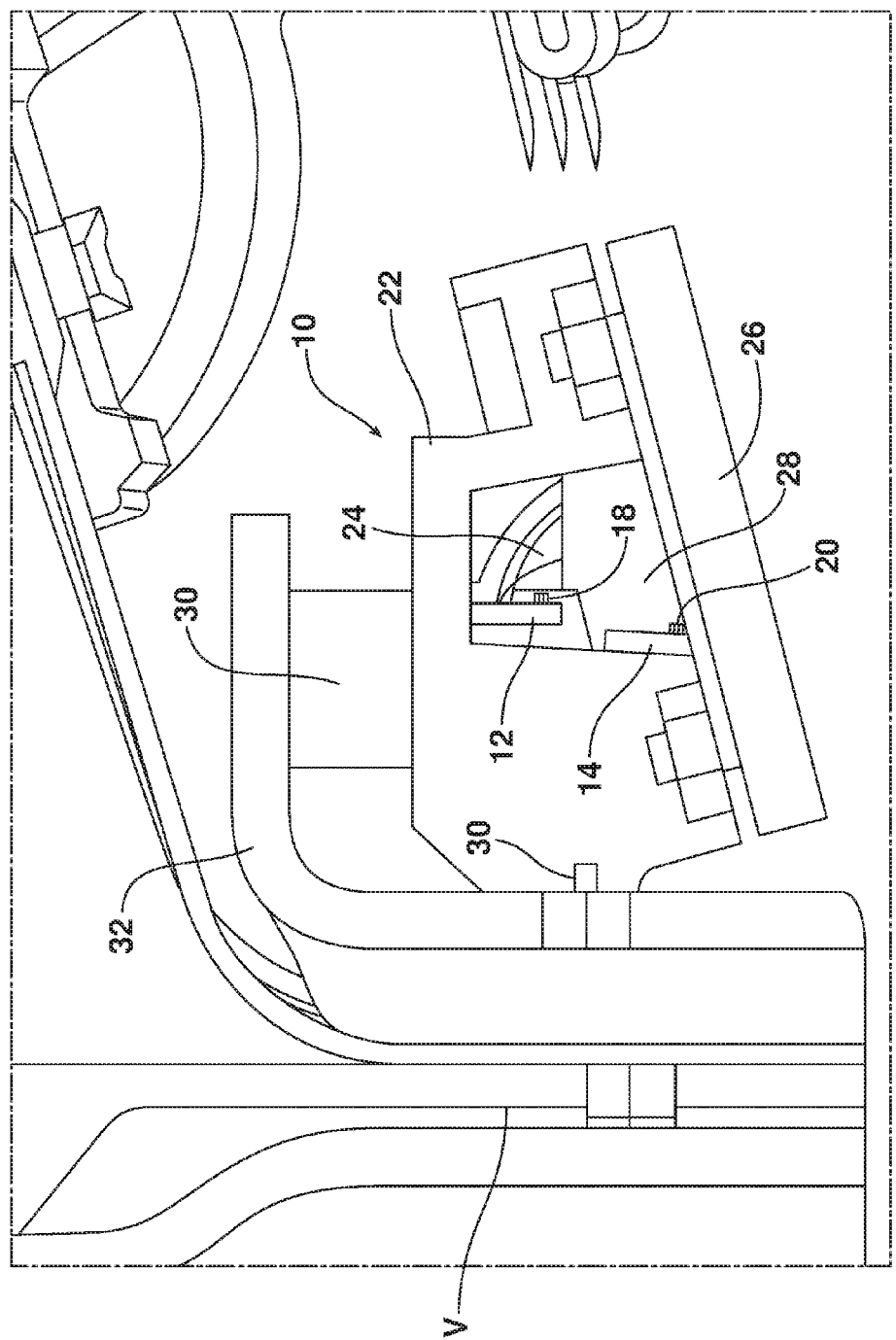
FIG. 1 is a detailed, schematic side elevational view of the lamp assembly housing of the running board illumination system including the first illumination element, the second illumination element, the parabolic reflector, the optic lens and the lamp assembly housing that holds those components.

Reference will now be made in detail to the present preferred embodiments of the running board illumination system, examples of which are illustrated in the accompanying drawing figures.

DETAILED DESCRIPTION

Reference is now made to FIGS. 1-5 illustrating the running board illumination system 10 that is the subject matter of this document. That system 10 includes a first illumination element 12, a second illumination element 14 and a controller 16. In the illustrated embodiment, the first illumination element 12 comprises a first plurality of white light emitting diodes 18 aligned along a first axis $A_1$ running perpendicular to the plane of the drawing figure. The second illumination element 14 comprises a second plurality of amber light emitting diodes 20 aligned along a longitudinal axis $A_2$ again running perpendicular to the plane of the drawing figure. These longitudinal axes $A_1$ and $A_2$ are better illustrated in FIG. 6. As illustrated, the second axis $A_2$ is offset from the first axis $A_1$. Further, the second axis is tilted with respect to the first axis. That tilt may be at an angle of between about 12° and 18° and typically is about 15°. The light emitting diodes 18, 20 may be provided on one or multiple printed circuit boards as desired.

As illustrated, the first illumination element 12 and the second illumination element 14 are carried in the lamp assembly housing 22. A parabolic reflector 24 is held in the housing 22 adjacent to the first illumination element 12. An optically prescribed fluted lens 26 closes the housing 22 providing a sealed interior compartment 28 for the first and second illumination elements 12, 14 and the parabolic reflector 24 so that those components are protected from dust and moisture.

Figure 4:
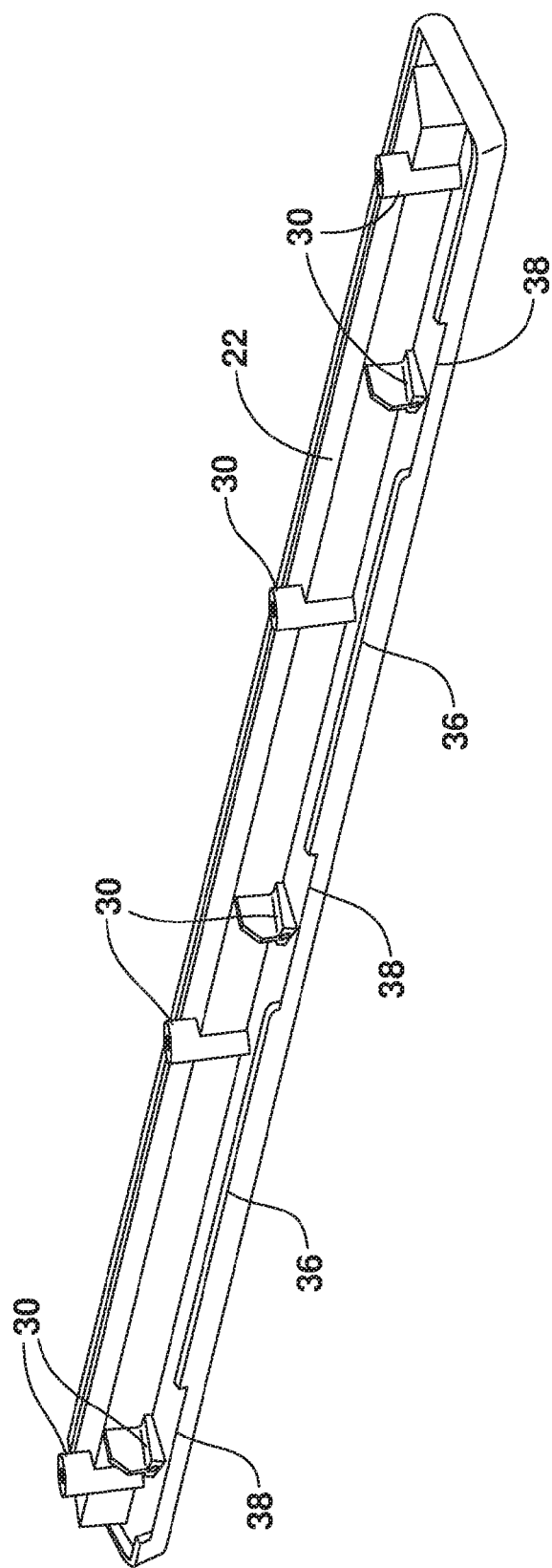
FIG. 4 is a rear perspective view of the lamp assembly housing illustrating the drainage slots provided in the rearmost flange of that housing.

As illustrated in FIGS. 1 and 4, the lamp assembly housing 22 includes a series of mounting bosses 30 for receiving fasteners such as screws (not shown) to mount the lamp assembly housing 22 to the mounting bracket 32. Similarly, the mounting bracket 32 includes bosses 34 for receiving screws or other fasteners to mount the bracket to the motor vehicle V behind/beneath the side sill S. As further shown, the rear flange 36 of the lamp assembly housing 22 includes a series of spaced drainage slots 38 to allow the drainage of water away from the lamp assembly housing 22.

Figure 2:
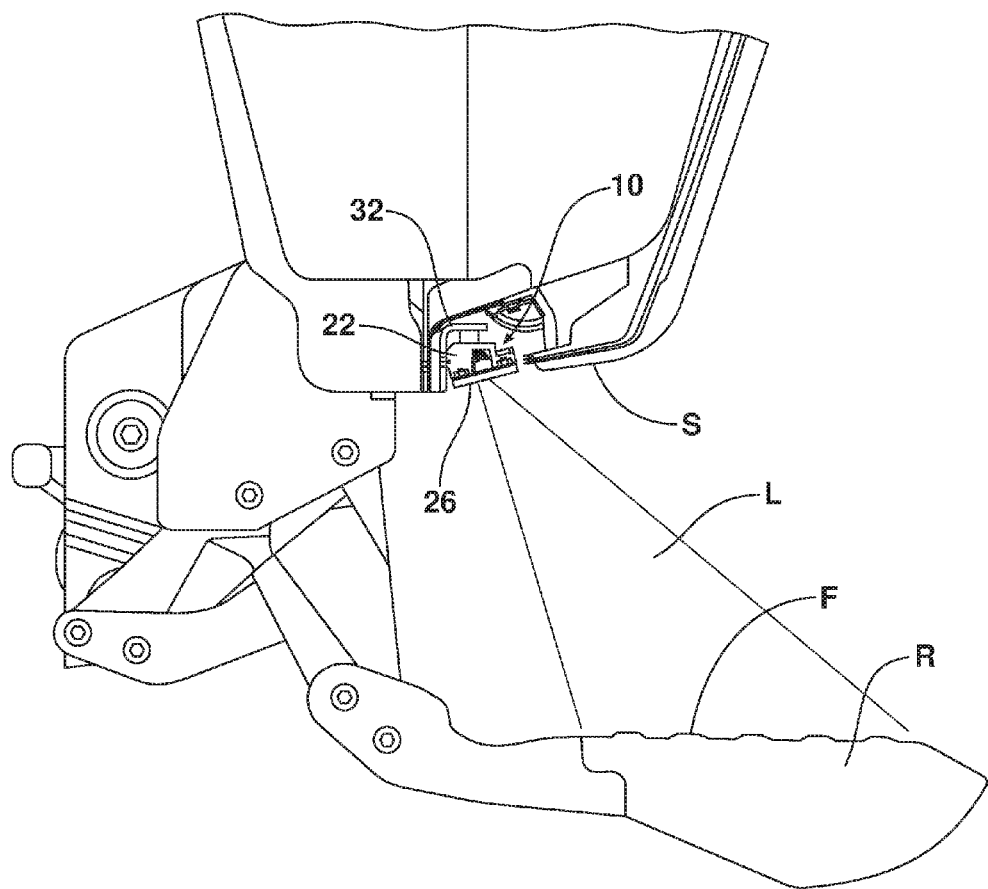
FIG. 2 is a schematic side elevational view illustrating the running board in the lowered, deployed position with light from the first illumination element being directed down upon only the footpad surface of the running board.
Figure 3:
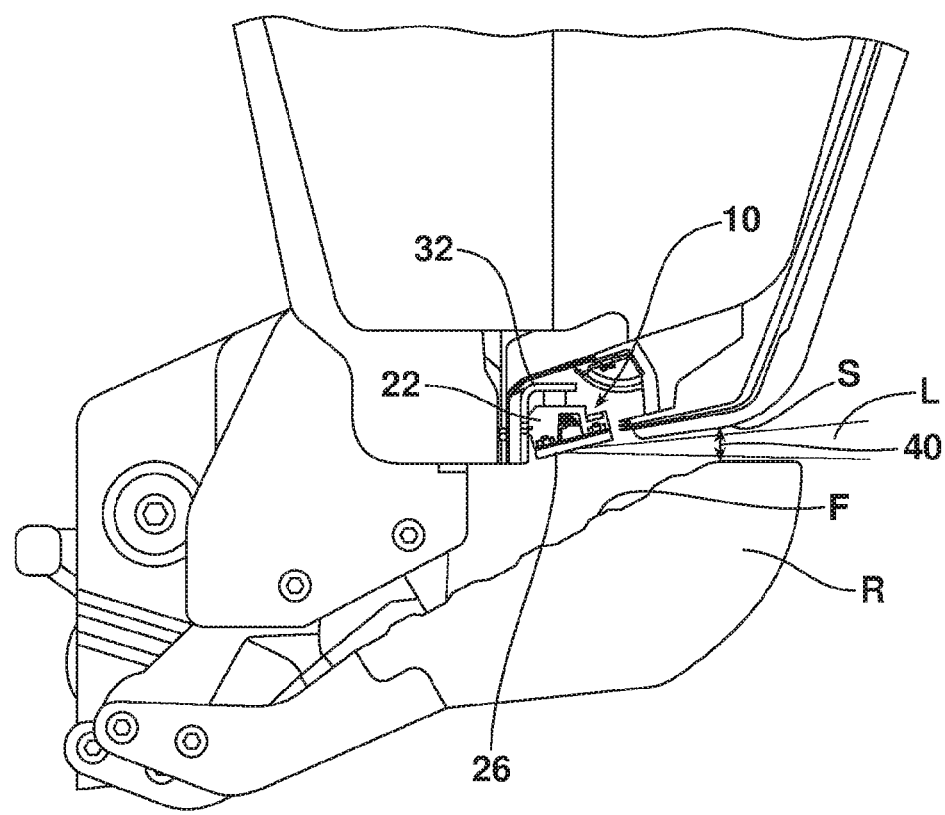
FIG. 3 is a view similar to FIG. 2 illustrating the running board in the raised, stowed position with light from the second illumination element being directed through the gap between the bottom of the side sill and the top of the running board.

Reference is now made to FIGS. 2 and 3 which illustrate the displaceable running board R of the motor vehicle V in the lowered, deployed position (FIG. 2) and the raised, stowed position (FIG. 3). As illustrated, when the running board R is lowered, the first illumination element 12/first plurality of white LEDs 18 direct white light L through the parabolic reflector 24 and the optic lens 26 downwardly onto only the treaded footpad surface F of the running board so an individual may quickly find and identify that footpad surface for positioning his/her foot to aid in entering the passenger cabin of the motor vehicle V. This white light provides an opulent appearance to the entry/exit activity of the vehicle.

When the motor vehicle V is operated at speed, the running board R is maintained in a raised, stowed position and the second illumination element 14/second plurality of amber LEDs 20 is oriented to direct amber light L through the gap 40 between the top of the running board R and the bottom of the side sill S. See FIG. 3. This amber light L provides an aesthetically pleasing accent to the side of the motor vehicle V.

Figure 5:
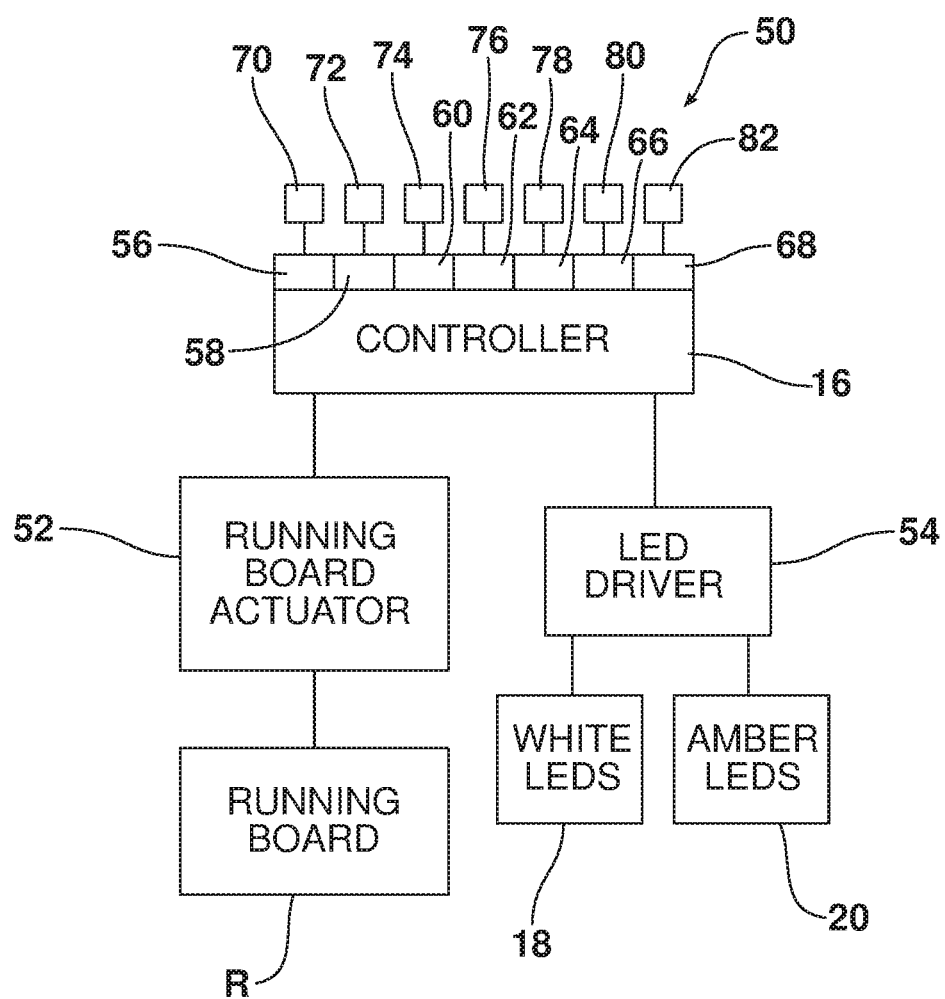
FIG. 5 is a schematic block diagram of the control circuit of the running board illumination system.
Figure 6:
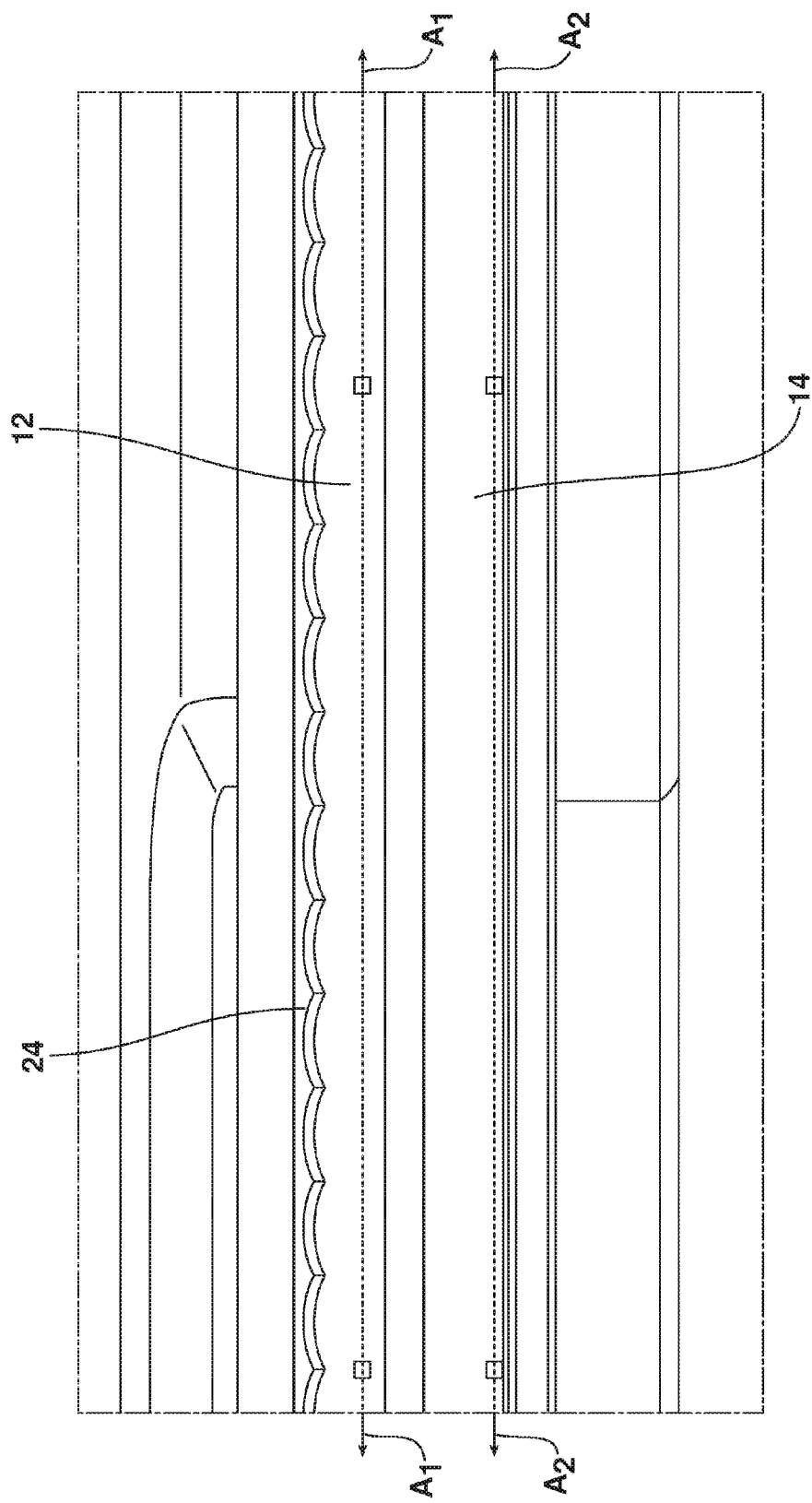
FIG. 6 is a schematic side elevation view of the lamp assembly showing the offset longitudinal axes of the two illumination elements.

Reference is now made to FIG. 5 illustrating the control circuit 50 for the running board illumination system 10. That control circuit 50 includes the controller 16 which may be connected to a running board actuator 52 for displacing the running board R between the lowered, deployed position illustrated in FIG. 2 and the raised, stowed position illustrated in FIG. 3. Further, the controller 16 may be operatively connected to a single LED driver 54 that may be utilized to drive or power the first and second illumination elements 12, 14/first and second plurality of LEDs 18, 20 where only one of the first or second illumination element/first or second set of LEDs is driven at any one time. This helps to reduce system 10 costs and limit heat sink requirements. Thus, the PCB boards carrying electronic circuitry and LEDs serve as sufficient heat sink.

The controller 16 may be a dedicated microprocessor, a computing device operating specific software instructions or other appropriate electronic control unit (ECU). Thus, the controller 16 may include one or more processors, one or more memories and one or more network interfaces all communicating with each other over a communication bus.

The controller 16 is configured to receive information respecting at least one motor vehicle status and is also adapted to illuminate the running board R with either the first illumination element 12/first plurality of white LEDs 18 or the second illumination element 14/second plurality of amber LEDs 20 based upon that information. Thus, the controller includes various data inputs 56, 58, 60, 62, 64, 66, 68. In the illustrated embodiment, input 56 is connected to a running board position sensor or other device 70 providing data input respecting the position of the running board R. Input 58 is connected to a transmission status sensor or other device 72 providing data respecting the status of the transmission. Input 60 is connected to a speed sensor or other device 74 providing input data respecting the ground speed of the motor vehicle V. Input 62 is connected to a turn signal sensor or other device 76 providing input data respecting the status of the turn signal in the motor vehicle V. Input 64 is connected to an emergency flasher sensor or other device 78 providing input data respecting the status of the emergency flasher of the motor vehicle V.

Input 66 is connected to a light sensor or other device 80 providing input data respecting the ambient light conditions in which the motor vehicle V is being operated. Input 68 is connected to a sensor or other device 82 providing alarm button state data respecting the alarm button on the key fob (not shown) of the motor vehicle V. As will be described in greater detail below, the controller 16 is configured to operate the first illumination element 12/first plurality of white LEDs 18 and second illumination element 14/second plurality of amber LEDs 20 in response to data received at the inputs 56, 58, 60, 62, 64, 66 and 68.

Thus, it should be appreciated that a method is provided of illuminating a running board R on a motor vehicle V. That method may be broadly described as equipping the motor vehicle V with a running board illumination system 10 including a first illumination element 12 having a first color, a second illumination element 14 having a second color and a controller 16. The method includes selectively illuminating the running board R with light emitted by the first illumination element 12 when the running board is in a lowered, deployed position as illustrated in FIG. 2 and selectively illuminating the running board with light emitted by the second illumination element 14 when the running board is in a raised, stowed position as illustrated in FIG. 3. Thus, the method includes activating the first illumination element 12 or second illumination element 14 depending on data received from the position sensor 70 through the data input 56.

In another embodiment, the method includes the controller 16 receiving information respecting transmission state and vehicle speed from the sensors or devices 72, 74 through the inputs 58, 60. In this embodiment, the first illumination element 12 is activated by the controller 16 when (a) the transmission is in park or the transmission is shifted into gear from park but remains stationary (ground speed is zero) and (b) the running board R is in the lowered, deployed position illustrated in FIG. 2 so as to illuminate the step face F. In contrast, the second illumination element 14 is activated by the controller 16 when the transmission is in gear and ground speed is other than zero and the running board R is in the raised, stowed position illustrated in FIG. 3 so as to provide accent lighting through the gap 40 between the side sill S and the top of the running board R.

In yet another embodiment, the method includes operating or activating, by the controller 16, the second illumination element 14 as a redundant turn signal. In one possible embodiment, the method may also include alternating, by the controller 16, the redundant turn signal of the second illumination element 14 with the main turn signal of the motor vehicle V. In yet another embodiment, the second illumination element includes multiple groups of amber LEDs 20 extending longitudinally along the vehicle above the running board R and the controller 16 operates or activates the second illumination element 14 so as to provide a sequential turn signal from the forwardmost group to the rearwardmost group or from rearwardmost group to the forwardmost group.

In yet another embodiment, the method includes operating or activating, by the controller 16, the second illumination element 14 as a redundant emergency flasher. In one possible embodiment, the controller 16 operates the redundant emergency flasher of the second illumination element 14 so that it alternates with the main emergency flasher of the motor vehicle V. Such redundant operation helps attract the attention of others.

In yet another possible embodiment, the method includes flashing, by the controller 16, both the first illumination element 12 and the second illumination element 14 when the running board R is being displaced from the raised, stowed position illustrated in FIG. 3 to the lowered, deployed position illustrated in FIG. 2. In yet another embodiment, the method includes varying, by the controller 16, the light intensity of the first illumination element 12 and/or the second illumination element 14 based upon the ambient light conditions as detected by the ambient light sensor 80 and provided to the controller input 66.

In still another embodiment, the method includes varying, by the controller 16, the light intensity of the first illumination element 12 and/or the second illumination element 14 based upon an alarm button state on the motor vehicle key fob as detected by the alarm button sensor/detector 82 and provided to the controller input 68.

In summary, a running board illumination system 10 and related method provide a number of benefits and advantages that make them value added features for a motor vehicle. During operation of the vehicle at speed, the amber light emitted by the second illumination element 14/second plurality of amber LEDs 20 through the gap 40 between the side sill S and the raised running board R provides distinctive and aesthetically pleasing accent lighting. As noted, that lighting feature may be made redundant to the emergency flashers and the turn signals of the vehicle if desired. In contrast, when the motor vehicle is placed in park, the controller 16 deactivates the second illumination element 14/second plurality of amber LEDs 20 and activates the first illumination element 12/first plurality of white LEDs 18 so that white light is emitted onto the step face F of running board R to allow one to quickly locate that step face and use it as an aid to enter the motor vehicle under lowlight ambient conditions. Significantly, the system may also be configured to maintain the white light from the first illumination element 12/first plurality of white LEDs 18 on only the footpad surface F when the vehicle is shifted into reverse or forward speed so long as the ground speed of the motor vehicle based upon data provided to the ground speed input 60 is zero. Thus, should the vehicle operator place the transmission in a forward or reverse gear prior to entry of the passenger into the motor vehicle, the first illumination element 12/first plurality of white LEDs 18 continues to emit white light on only the footpad surface F of the running board R beneath the passenger door to aid the passenger in finding the running board R and entering the vehicle. The white light provides an opulent appearance. Once the ground speed of the vehicle indicates movement in either a forward or reverse direction, the controller 16 extinguishes the first illumination element 12/first plurality white LEDs 18 and energizes or activates the second illumination element 14/second plurality of amber LEDs 20 to provide accent lighting for the running board R which may be automatically raised by the controller controlled actuator 52 into the stowed position when the motor vehicle V is put into motion.

Still further, the running board illumination system 10 provides an additional feature to help an operator find the vehicle in a dark, crowded parking lot. More specifically, when an operator depresses the alarm/search button on the key fob of the motor vehicle V, the controller 16 will cause the running board R to be lowered through the running board actuator 52. Simultaneously, the first and second illumination elements 12, 14/first and second plurality of amber LEDs 18, 20 will pulse to provide alternate, flashing white and amber lighting adjacent the running board R. This pulse may be at three times the current so as to provide approximately six times the light output normally provided by the elements 12, 14/LEDs 18, 20 so that the flashing is more effective in drawing attention to the vehicle.

The foregoing has been presented for purposes of illustration and description. It is not intended to be exhaustive or to limit the embodiments to the precise form disclosed. Obvious modifications and variations are possible in light of the above teachings. For example, the controller 16 may also function to control the intensity of the light emitted by the first illumination element 12/first plurality of white LEDs 18 and second illumination element 14/second plurality of amber LEDs 20 as desired. Thus, for example, the light intensity may be increased to a maximum over three seconds as the running board R is deployed from the raised, stowed position illustrated in FIG. 3 to the lowered, deployed position illustrated in FIG. 2. Similarly, the light intensity may be decreased to shut off as the running board R is displaced from the lowered, deployed position to the raised, stowed position over a span of five seconds. In other embodiments light with colors other than white and amber may be used. LEDs that change color may also be employed if desired. Further, chrome or white accent stripes may be provided on the surfaces of the side sill S and running board R identified at the double arrow 40 where they will function as reflectors to enhance light output through the gap 40. All such modifications and variations are within the scope of the appended claims when interpreted in accordance with the breadth to which they are fairly, legally and equitably entitled.

What is claimed:

1. A running board illumination system for a motor vehicle, comprising:
   a first illumination element having a first color;
   a second illumination element having a second, different color; and
   a controller configured to receive information respecting at least one motor vehicle status and adapted to illuminate a running board with said first illumination element or said second illumination element based upon said information, wherein said information relates to vehicle transmission status.

2. The running board illumination system of claim 1, wherein said information also relates to vehicle speed.

3. The running board illumination system of claim 1, wherein said information also relates to running board position where said running board may be displaced between a raised, stowed position and a lowered, deployed position.

4. The running board illumination system of claim 1, wherein said first illumination element is a first plurality of light emitting diodes having said first color, said second illumination element is a second plurality of light emitting diodes having said second color and said running board illumination system includes a single LED driver responsive to said controller for independently driving said first plurality of light emitting diodes and said second plurality of light emitting diodes.

5. A method of illuminating a running board on a motor vehicle, comprising:
   equipping said motor vehicle with a running board illumination system including a first illumination element having a first color, a second illumination element having a second color and a controller;
   selectively illuminating said running board with light emitted by said first illumination element when said running board is in a lowered, deployed position; and
   selectively illuminating said running board with light emitted by said second illumination element when said running board is in a raised, stowed position.

6. The method of claim 5, further including receiving, by said controller, information respecting transmission state and vehicle speed and selectively illuminating said running board with said first illumination element or said second illumination element based upon said information.

7. The method of claim 5, further including operating, by said controller, said second illumination element as a redundant turn signal.

8. The method of claim 7, further including alternating, by said controller, said redundant turn signal with a main turn signal of the motor vehicle.

9. The method of claim 5, further including operating, by said controller, said second illumination element as a sequential turn signal.

10. The method of claim 5, further including operating, by said controller, said second illumination element as a redundant emergency flasher.

11. The method of claim 10, further including alternating, by said controller, said redundant emergency flasher with a main emergency flasher of the motor vehicle.

12. The method of claim 5, further including flashing, by said controller, both of said first illumination element and said second illumination element when said running board is being displaced from said raised, stowed position to said lowered, deployed position.

13. The method of claim 5, further including varying, by said controller, light intensity of said first illumination element and said second illumination element based upon ambient light conditions.

14. The method of claim 5, further including varying, by said controller, light intensity of said first illumination element and said second illumination element based upon an alarm/search button state on a motor vehicle key fob.

15. A running board illumination system for a motor vehicle, comprising:
   a first illumination element having a first color;
   a second illumination element having a second, different color;
   a controller configured to receive information respecting at least one motor vehicle status and adapted to illuminate a running board with said first illumination element or said second illumination element based upon said information; and
   a lamp assembly housing wherein said first illumination element is oriented on a first longitudinal axis within said lamp assembly housing and said second illumination element is oriented on a second longitudinal axis within said lamp assembly housing wherein said second axis is offset from said first axis.

16. The running board illumination system of claim 15, wherein said second axis is tilted with respect to said first axis.

17. The running board illumination system of claim 15, further including a parabolic reflector adjacent said first illumination element and an optically prescribed fluted lens carried by said lamp assembly housing.

18. The running board illumination system of claim 17, wherein said first illumination element emits white light that is directed by said parabolic reflector through said optic lens onto a step face of said running board when said running board is in a lowered, deployed position.

19. The running board illumination system of claim 18, wherein said second illumination element emits amber light that passes through said optically prescribed fluted lens and a gap between said running board and a side sill of said motor vehicle when said running board is in a raised, stowed position.

* * * * *